Figure 1:
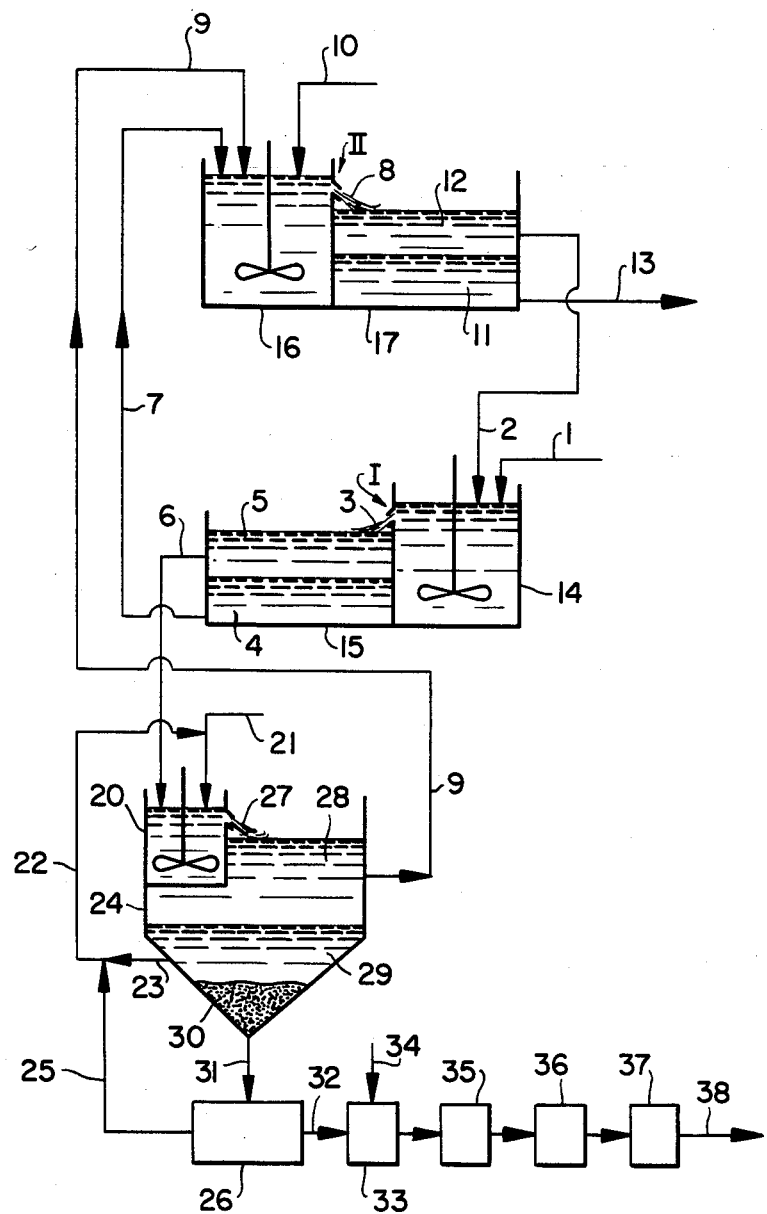

United States Patent [19]

Gardner

[11] Patent Number: 4,594,235

[45] Date of Patent: Jun. 10, 1986

[54] PROCESS FOR THE PRODUCTION OF VANADIUM CARBIDE

[75] Inventor: Harry E. Gardner, Grand Junction, Colo.

[73] Assignee: Union Carbide Corporation, Danbury, Conn.

[21] Appl. No.: 746,374

[22] Filed: Jun. 19, 1985

Related U.S. Application Data

[60] Division of Ser. No. 498,710, May 27, 1983, Pat. No. 4,540,562, which is a continuation of Ser. No. 298,197, Aug. 31, 1981, abandoned, which is a continuation of Ser. No. 106,737, Dec. 26, 1979, abandoned.

[51] Int. Cl.$^4$ .............................................. C01B 31/30
[52] U.S. Cl. .................................................. 423/440
[58] Field of Search .................... 423/440, 62, 63, 64, 423/66, 592

[56] References Cited

U.S. PATENT DOCUMENTS

| | | | |
|---|---|---|---|
| Re. 25,588 | 6/1964 | Kelmers | 423/67 |
| 1,421,191 | 6/1922 | Erickson . | |
| 2,797,143 | 6/1957 | Arendale et al. | 23/14.5 |
| 2,800,387 | 7/1957 | Kimball et al. | 23/14.5 |
| 2,807,518 | 9/1957 | Ellis et al. | 23/14.5 |
| 3,063,795 | 11/1962 | Smith | 23/51 |
| 3,063,796 | 11/1962 | Kelmers | 23/51 |
| 3,131,993 | 5/1964 | Gustison et al. | 23/18 |
| 3,132,920 | 5/1964 | Goren | 23/18 |
| 3,320,024 | 5/1967 | Burwell | 23/18 |
| 3,607,055 | 9/1971 | Case, Jr. | 423/440 |
| 4,061,712 | 12/1977 | Morgan et al. | 423/67 |
| 4,212,849 | 7/1980 | Lucid et al. | 423/10 |
| 4,241,027 | 12/1980 | Bowerman et al. | 423/10 |
| 4,243,639 | 1/1981 | Haas et al. | 423/63 |

*Primary Examiner*—Edward J. Meros
*Attorney, Agent, or Firm*—Norman L. Balmer

[57] ABSTRACT

A process is provided for the production of vanadyl hydrate including solvent extraction and stripping steps. The vanadyl hydrate is then reacted with carbon to produce vanadium carbide.

17 Claims, 1 Drawing Figure

PROCESS FOR THE PRODUCTION OF VANADIUM CARBIDE

This application is a division of prior U.S. application Ser. No. 498,710, filed 5-27-83, now U.S. Pat. No. 4,540,562 which is a continuation of application Ser. No. 298,197, filed 8-31-81, now abandoned, which is a continuation of application Ser. No. 106,737, filed 12-26-79, now abandoned.

This invention relates to a process for the production of vanadium carbide $V_2C$. This invention also relates to a process for the production of vanadyl hydrate, $VO(OH)_2.xH_2O$, which is used to produce vanadium carbide by the method of this invention. In particular, this invention relates to a solvent extraction, stripping process for the production of vanadyl hydrate which is further reacted with carbon by the method of this invention to produce vanadium carbide. Vanadium carbide is well known in its use in the production of steel.

In accordance with the present invention an ionic aqueous vanadium solution, such as a water leach solution containing sodium metavanadate, derived from vanadium diumores or concentrates, is provided. To this water leach solution sulfur dioxide, $SO_2$, and sulfuric acid, $H_2SO_4$, are added in amounts described in detail hereinafter. The solution which contains vanadyl ion is then solvent extracted with an organic solvent, described in more detail hereinafter. The rich organic solvent containing the vanadyl ion is then stripped with ammonium hydroxide, $NH_4OH$, causing the vanadyl ion to precipitate as vanadyl hydrate, $VO(OH)_2.xH_2O$, where x is unknown, as the vanadyl ion is removed from the solvent. In accordance with the present invention, the vanadyl hydrate is blended with carbon, pelletized, and dried in the absence of oxygen and then furnaced to form vanadium carbide.

The method of the invention will become more clear when considered together with the accompanying drawing which is set forth as being merely illustrative of the invention and is not intended to be limitative thereof and wherein:

FIG. 1 is a simplified flow diagram illustrating an embodiment of the method of the invention.

The water leach solution used in the practice of this invention is typically derived from the conventional processing of vanadium ores or concentrates, such as the water leach solution from a roasted vanadium ore. Typical vanadium processes are described in U.S. Pat. Nos. 3,132,920; 3,132,390; and 3,320,024. It is preferable that the water leach solution be a true solution to avoid contamination of the product and to ease processing. It has been found that the present invention only works for vanadium in an aqueous solution. Typically a water leach solution is an ionic solution of sodium metavanadate, $NaVO_3$, with minor amounts of chloride, sulphate, phosphate, and silicate salts of sodium, calcium, potassium, magnesium, and other alkali and alkaline earth metals, and other impurities usually found in water leach solutions derived from the processing of vanadium ores or concentrates. For the process of this invention to work satisfactorily the vanadium must be in solution. However, the vanadium in solution may exist combined with other elements as an ionic species such as a vanadate ion in an ionic solution of sodium metavanadate. The vanadium in solution may also be derived from alkali, or alkaline earth salts of pyrovanadate, orthovanadate, decavanadate, or any other soluble form of vanadium salts. Particularly in the practice of this invention, the source of vanadium is sodium metavanadate. The concentration of sodium metavanadate in water is not critical and any concentration is satisfactory in the practice of this invention as long as the sodium metavanadate is in solution. While there is no preferred concentration for the sodium metavanadate in solution it may be desirable at times in order to save processing expenses to use as high a concentration as possible. Sulfur dioxide and sulfuric acid are then added to the water leach solution. Preferably, the sulfur dioxide is added first and then the sulfuric acid in order to avoid precipitation of vanadium as sodium hexavanadate if the sulfuric acid is added first. The sulfur dioxide is added in a sufficient quantity to reduce the vanadium ion in solution from $V^{+5}$ to $V^{+4}$ valence. Enough sulfuric acid is then added to obtain a pH in the range from about 1.0 to about 3.0, preferably about 1.5 to about 3.0, and more preferably about 2.0, to obtain an optimum pH for solvent extraction whose efficiency is sensitive to the pH. In a continuous process the sulfur dioxide and the sulfuric acid can be added simultaneously to the water leach solution. While sulfuric acid is the preferable acid to use, other nonoxidizing acids such as hydrochloric acid may be used. Nitric acid should not be used since it is an oxidizing acid. Acetic acid should not be used since it is not strong enough. Phosphoric acid should also not be used since it contaminates the product. The $V^{+5}$ to $V^{+4}$ reduction is measured by e.m.f. potential. The $V^{+5}$ to $V^{+4}$ reduction is considered complete when the optimum e.m.f. potential obtained is about $-200$ millivolts at a pH2. An e.m.f. potential in the range of from about $-150$ to about $-300$ millivolts is also considered satisfactory in the practice of this invention. $V^{+5}$ exists in the metavanadate ion, $VO_3^-$, and $V^{+4}$ exists in the vanadyl ion, $VO^{+2}$. The concentration of sulfuric acid is not critical and can be added in any concentration but a higher concentration is desirable in order to avoid dilution of the solution. The sulfur dioxide is preferably added as sulfur dioxide gas but it can also be added in the form of sulfurous acid or as a sulphite salt.

The acidified and reduced solution containing vanadyl ion is now solvent extracted, preferably, in at least a two stage countercurrent solvent extractor. The solvent extraction step will become more clear when considered along with the illustration of FIG. 1. The acidified and reduced solution containing the vanadyl ion 1 enters stirred mixer tank 14 of Stage I of the countercurrent extraction step and is mixed with the organic phase stream 2 from settler tank 17 of Stage II. Mixed liquid 3 from mixer tank 14 overflows into settler tank 15 of Stage I with the organic phase 5 rising to the top and the aqueous phase 4 to the bottom of settler tank 15. The rich organic solvent phase 5 of settler tank 15 is sent as stream 6 to further processing described hereinafter. The aqueous phase 4 of settler tank 15 is then transferred as stream 7 to mixer tank 16 of Stage II wherein it is mixed with lean organic solvent 9 and sulfuric acid 10. The mixed liquid 8 overflows mixer tank 16 into settler tank 17 wherein the organic phase 12 rises to the top of settler tank 17 and the aqueous phase 11 settles to the bottom of settler tank 17. The aqueous phase 11 which is the raffinate, also called tails, is discarded as waste 13. The organic phase 12 of settler tank 17 is sent to mixer tank 14 as stream 2. While the two stage countercurrent extraction step has been shown in FIG. 1 in a simplified fashion, more sophisticated equipment may be used including more than two stages without departing from the scope of this invention. One stage may be used but this is not deemed to be as effective as at least two countercurrent extraction stages. It is conceivable that a cocurrent extraction step may be used but that would also be less effective than a countercurrent extraction step. The solvent extraction step is a purification step in the process of this invention.

Because the solvent extraction step consumes acid, sulfuric acid or other non-oxidizing acid is added to the Stage II mixer tank 16 to control the pH at an optimum level of from about 2.5 to about 3, preferably from about 1.5 to about 3.5 in order to obtain the most efficient extraction of the vanadyl ion by the organic solvent.

The preferred organic solvent for use in the extraction step is di-2-ethyl hexyl phosphoric acid as a 10% solution by volume. In addition, the solvent solution contains 3% by volume of isodecanol (isodecylalcohol), and 87% by volume of kerosene as a diluant. The di-2-ethyl hexyl phosphoric acid does the actual extracting of vanadium from the aqueous solution by complexing with it. The isodecanol helps keep the vanadium complex in solution. Other solvents have not been used but it is very conceivable that others will work such as heptadecyl-phosphoric acid in mixture with isodecanol and kerosene. The volume percentages of the components of the organic solvent can be varied by those skilled in the art without departing from the scope or purpose of the invention.

The rich organic solvent phase 5 containing the vanadyl ion is then solvent stripped and thickened. This is accomplished by first sending the rich organic solvent phase as stream 6 to mixer tank 20 wherein it is mixed with ammonium hydroxide 21 and a recycle stream 22 containing recycled aqueous solution 23 from settler-thickener tank 24 and aqueous filtrate 25 from filter 26. It is deemed novel to use ammonium hydroxide to strip vanadium from the solvent by chemically reacting with the solvent to form the ammonium salt of di-2-ethyl hexyl phosphoric acid, thus regenerating the solvent. Sufficient excess ammonium hydroxide is added to mixer tank 20 to strip the vanadium from the solvent. In the previous extraction step, ammonium ion is exchanged for vanadyl ion, while in the stripping step the vanadyl ion is replaced with the ammonium ion. In the stripping step, the vanadyl ion precipitates as vanadyl hydrate, $VO(OH)_2 \cdot xH_2O$, where x is unknown, as vanadyl ion is removed from the solvent.

The stripped mixture 27 from mixer tank 20 overflows into settler-thickener tank 24, wherein three phases form, an organic phase 28 on top comprising lean solvent which is sent to extraction Stage II as stream 9; below the organic phase 28, an aqueous solution phase 29 which contains excess ammonium hydroxide which is then combined with aqueous filtrate 25 from filter 26 and sent as stream 22 to mixer tank 20 combined with ammonium hydroxide 21; and a solid phase 30 comprising vanadyl hydrate which settles to the bottom of settler-thickener tank 24, which is sent as stream 31 to filter 26. It is novel and unexpected that three phases form in settler thickener tank 24 and also that vanadyl hydrate separates out as a third phase rather than as an emulsion.

The filtrate 25 from filter 26 is combined with the aqueous solution stream 23 from settler-thickener tank 24 and recycled as described above.

Filtered wet solid vanadyl hydrate 32 is blended in blender 33 with carbon 34 and then pelletized in pelletizer 35, dried in dryer 36 in the absence of oxygen or air, and then furnaced in furnace 37 under vacuum or inert atmosphere to form vanadium carbide, $V_2C$ shown as stream 38 in FIG. 1. It is deemed novel to reduce vanadyl hydrate with carbon to produce vanadium carbide. In the past, vanadium carbide was produced from carbon and vanadium trioxide, $V_2O_3$.

The invention will become more clear when considered together with the following example which is set forth as being merely illustrative of the invention and which is not intended, in any manner, to be limitative thereof. Unless otherwise indicated, all parts and percentages are by weight.

EXAMPLE

The sample treated consisted of 2097 liters of water leach solution produced from a vanadium ore that had been roasted with salt (NaCl). The solution assayed 4.05 grams $V_2O_5$ per liter, 27 grams Cl per liter and 7.8 grams $SO_4$ per liter. The solution was acidified and reduced using 0.91 grams $SO_2$ per gram $V_2O_5$ and 0.90 gram HCl per gram $V_2O_5$. The variations in the pH and emf were 1.8 to 2.4 and $-190$ to $-160$ mv. respectively.

This solution was processed by solvent extraction in a two stage mixer-settler apparatus at a nominal flowrate of one liter per minute. The raffinate averaged 0.04 g $V_2O_5$/L resulting in a recovery of 99 percent of the vanadium. The solvent was composed of 8% di-2-ethylhexyl phosphoric acid, 3% Isodecanol, and 89% kerosene by volume. The vanadium enriched solvent contained 7.1 g $V_2O_5$/L. The rich solvent was stripped by contacting with 120 g $NH_4OH$ per liter solution in a mixer then separated into three phases in a settler-thickener tank.

The barren solvent was recycled to the extraction circuit. The aqueous solution phase was reconstituted with concentrated $NH_4OH$ to provide stripping solution. The solid vanadyl hydrate slurry was removed from the the settler-thickener tank as a slurry, filtered and collected as a wet filter cake. A sample of this product (dried at 130° C.) assayed 91.0% $V_2O_5$, 0.53% S, 0.21% $Fe_2O_3$, 0.01% $SiO_2$ and 0.022% P.

A portion of the wet filter cake was mixed with powdered carbon and powdered iron using a ratio of 3.27 parts $V_2O_5$ to one part carbon and sufficient iron powder to result in about 2% Fe in the final product. Iron is commonly added as a densifying agent in the production of vanadium carbide but is not necessary in the practice of this invention. This mixture was formed into pellets about one centimeter in diameter which were then dried and reduced to vanadium carbide in an induction furnace under an argon atmosphere at 1700° C. The product assayed 85.45% V, 9.99% C, 0.57% O and 0.002% N. This product is vanadium carbide ($V_2C$).

Although the present invention has been described and set forth in some detail, it should be further understood that the same is susceptible to changes, modifications and variations without departing from the scope and spirit of the invention.

What is claimed is:

1. A method for the manufacture of vanadium carbide comprising the steps of:
   (a) providing an aqueous solution of vanadate ion;
   (b) adding sulfur dioxide and a non-oxidizing acid to said aqueous solution to reduce said vanadate ion to the vanadyl ion;
   (c) solvent extracting said vanadyl ion from said aqueous solution with an organic solvent comprising di-2-ethyl hexyl phosphoric acid or heptadecyl phosphoric acid;

(d) stripping said vanadyl ion from said organic solvent with ammonium hydroxide to form in three separate phases, an organic solution, an aqueous solution and a solid precipitate of vanadyl hydrate;

(e) separating the solid vanadyl hydrate from said organic and aqueous solutions;

(f) blending said solid vanadyl hydrate with carbon; and (g) furnacing the blend of vanadyl hydrate and carbon to form vanadium carbide.

2. The method of claim 1 wherein said aqueous solution of step (a) is a water leach solution.

3. The method of claim 1 wherein said aqueous solution of step (a) is a solution of metavanadate ion.

4. The method of claim 1 wherein said sulfur dioxide is added to said aqueous solution before said non-oxidizing acid is added to said aqueous solution.

5. The method of claim 1 wherein said sulfur dioxide and said non-oxidizing acid are simultaneously added to said aqueous solution.

6. The method of claim 1 wherein said non-oxidizing acid is sulphuric acid.

7. The method of claim 1 wherein said non-oxidizing acid is hydrochloric acid.

8. The method of claim 1 wherein said non-oxidizing acid is added to said aqueous solution until a pH in the range of from about 1.0 to about 3.0 is obtained.

9. The method of claim 1 wherein said sulfur dioxide is added to reduce said vanadate ion to the vanadyl ion as measured by an e.m.f. potential at a pH of about 2 in the range of from about $-150$ to about $-300$ millivolts.

10. The method of claim 1 wherein said sulfur dioxide is added in the form selected from the group consisting of sulfur dioxide gas, sulfurous acid and a sulfite salt.

11. The method of claim 1 wherein said vanadyl ion is extracted with said organic solvent in a countercurrent extractor having at least two stages.

12. The method of claim 1 wherein the pH during extraction is maintained in the range of from about 1.5 to about 3.5 by the addition of a non-oxidizing acid.

13. The method of claim 1 wherein said organic solvent comprises a mixture of di-2-ethylhexyl phosphoric acid, isodecanol and kerosene.

14. The method of claim 1 wherein said organic solvent comprises a mixture of heptadecyl phosphoric acid, isodecanol and kerosene.

15. The method of claim 1 wherein the solid vanadyl hydrate is separated from said solvent by settling in a settler-thickener and then filtering excess liquid from said solid vanadyl hydrate.

16. The method of claim 1 wherein the vanadyl hydrate is wet when it is blended with carbon.

17. The method of claim 1 wherein the blend of vanadyl hydrate and carbon is pelletized and then dried in the absence of oxygen before the furnacing step.

* * * * *